United States Patent [19]

Labarre

[11] Patent Number: 4,741,092
[45] Date of Patent: May 3, 1988

[54] HANDLING DEVICE FOR CHANGING TOOLS OF A CUTTING PRESS

[75] Inventor: Claude Labarre, Bussigny, Switzerland

[73] Assignee: Bobst SA, Switzerland

[21] Appl. No.: 37,983

[22] Filed: Apr. 13, 1987

[30] Foreign Application Priority Data

Apr. 14, 1986 [CH] Switzerland ............ 1481/86

[51] Int. Cl.⁴ .............. B23Q 3/157; B30B 15/06
[52] U.S. Cl. ................... 29/568; 72/446; 83/549; 100/229 R
[58] Field of Search ............ 29/568, 26 A; 83/552, 83/549, 563, 698; 100/229 R, 9, 8; 72/446, 462

[56] References Cited

U.S. PATENT DOCUMENTS

| | | |
|---|---|---|
| 3,234,648 | 2/1966 | Knowles ............... 29/568 |
| 3,516,277 | 6/1970 | Bracco et al. ............ 72/446 |
| 4,152,978 | 5/1979 | Abe et al. ............ 72/446 X |
| 4,387,502 | 6/1983 | Dom ............... 29/568 |
| 4,417,511 | 11/1983 | Ikeoka ............ 100/229 R |
| 4,461,068 | 7/1984 | Schneider et al. ............ 29/568 |
| 4,624,044 | 11/1986 | Bredow et al. ............ 29/568 |
| 4,649,622 | 3/1987 | Scott ............... 29/568 |
| 4,675,977 | 6/1987 | Kölbun et al. ............ 29/568 |

FOREIGN PATENT DOCUMENTS

| | | | |
|---|---|---|---|
| 109533 | 7/1982 | Japan ............... 29/568 |
| 107734 | 7/1984 | Japan ............... 29/568 |
| 238044 | 11/1985 | Japan ............... 72/446 |
| 284413 | 12/1986 | Japan ............... 29/568 |
| 2160800 | 1/1986 | United Kingdom ............ 72/446 |
| 870189 | 10/1981 | U.S.S.R. ............ 72/446 |

Primary Examiner—William R. Briggs
Attorney, Agent, or Firm—Hill, Van Santen, Steadman & Simpson

[57] ABSTRACT

A handling device for exchanging tools in a platen press having at least two units arranged in a row for acting on a blank, said device includes a roller path extending along the press, a carrier member movable on the roller path, and having a vertical column receiving a lifting fork which is movable in the vertical direction to position a tool holder carriage coupled to the fork to the desired position. A table can be secured on the top of the fork for use by the operator of the press.

9 Claims, 11 Drawing Sheets

HANDLING DEVICE FOR CHANGING TOOLS OF A CUTTING PRESS

BACKGROUND OF THE INVENTION

The present invention is directed to a device for changing tools of a platen press which has a plurality of operating units which are arranged in a row to act on a blank sequentially as it moves through the press.

Known platen presses generally have a plurality of units arranged in a row, for example, a sheet feeding unit followed by a cutting unit, a waste ejection unit, a delivery unit for the cut blanks, and a delivery unit for the waste separated from the blanks. To operate properly, the cutting unit, the waste ejection unit and the blank delivery unit have to be provided with adequate tools. These tools are either a pair of plates with one plate of the pair being provided with cutting blades and/or creasing rules and the other plate having counter parts for the cutting blades and creasing rules, plates with fingers and pins for the injection of waste or are punches or dies with a form which corresponds to the form of the blank that is to be separated and delivered from the press. These tools are generally quite heavy and big and, consequently, difficult to handle.

A platen press is used for various jobs and, therefore, in case of a change of jobs, the operator has to replace the tools mounted in the various units by new tools corresponding to the new job. This is generally done by hand and usually requires at least two people for removing the tools from each of the units and storing them in a place for storage, and for replacing the removed tools by the new tools for the new job. This operation is repeated as often as the tools have to be changed, and this operation is quite tiresome for the operator. It also requires a relatively important loss of time and, thus, reduces the productivity of the press.

To facilitate the operator's work, the tools are removed from the cutting unit and are stored in various levels of a storage unit which has been previously moved in front of the cutting unit. The storage unit also receives tools for the next job. Adequately positioned in front of the location of the new tool in the machine, the level of the storage unit can easily be shifted in its operating position. When out of use, the storage unit can be retracted into the platform located adjacent the machine. This is a real improvement, but still has drawbacks of only being suited for the cutting unit. Elsewhere, the replacement of the tools still require at least two persons, because the storage unit which is retracted into the platform doesn't allow the erection of several successive storage units in front of the other units of the machine because of the lack of room and work security for the operator.

SUMMARY OF THE INVENTION

The object of the present invention is to eliminate the above-mentioned drawbacks and to allow the replacement by one person of all the tools used in the successive units of a platen press.

This object is achieved by means of a device for exchanging tools of a cutting or platen press having at least two units arranged in a row for acting on a blank sequentially as the blank moves through the press, said device including a roller path extending along a side of the press, a carrier member having a column being movable on said roller path, said column having a lifting fork movable vertical thereon and means for moving the fork vertically in said column, said fork having means for releasably coupling a tool holder carriage to said fork for movement therewith, said fork being provided with a table above the means for releasably coupling and said carrier member and said roller path having coacting means for centering the carrier at each unit and at a transfer station for the device.

Other advantages and features of the invention will be readily apparent from the following description of a preferred embodiment, drawings and claims.

DESCRIPTION OF THE PREFERRED EMBODIMENTS

Figure 1:
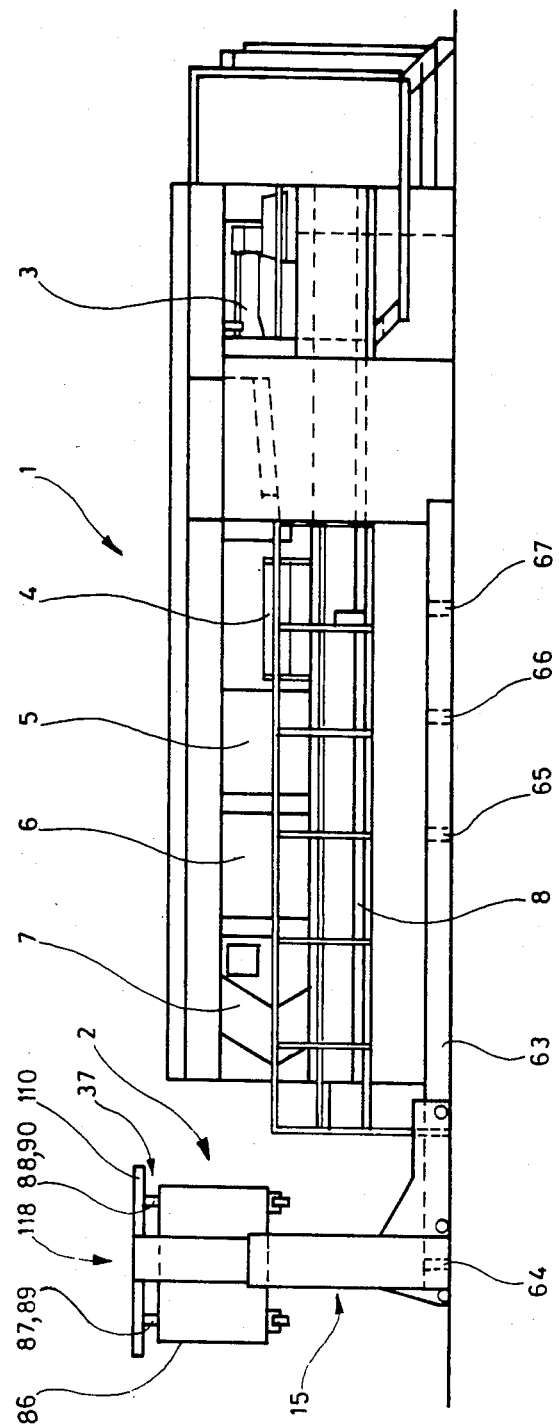
FIG. 1 is a side view of a platen press provided with a handling device in accordance with the present invention.
Figure 2:
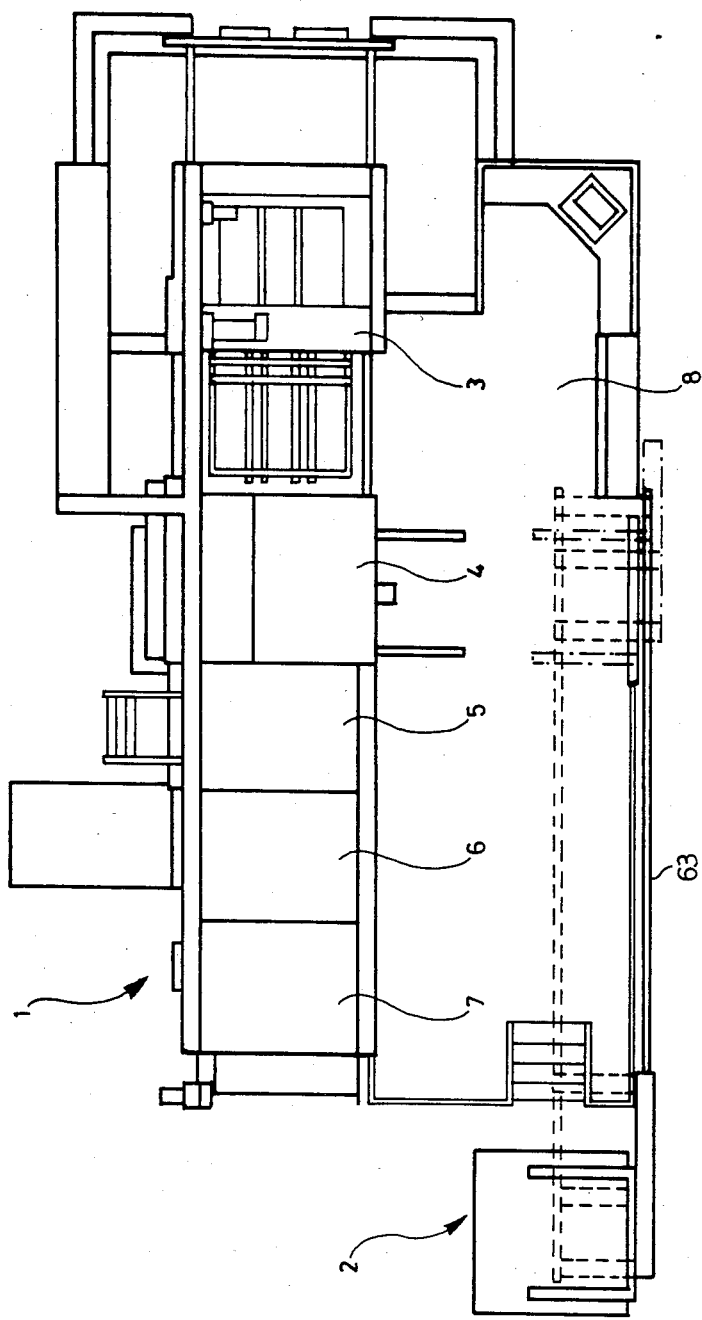
FIG. 2 is a plan view of the platen press with the handling device of the present invention, as illustrated in FIG.

The principles of the present invention are particularly useful when incorporated in a handling device, generally indicated at 2 in FIGS. 1 and 2 and utilized with a platen press, generally indicated at 1. The platen press 1 includes a feeding unit 3 followed by a cutting unit 4. The cutting unit 4 is followed by a waste ejection unit 5, which in turn is followed by a delivery unit 6 for the cut blanks and, finally, the unit 6 in turn is then followed by a delivery unit 7 for the waste resulting from the separation of the blanks from the sheets being processed. The platen press 1 is also equipped with a platform 8 which extends along a side of the units of the platen press, as illustrated in FIG. 2, and enables access by the operator to the various mentioned units. As best illustrated in FIGS. 1 and 2, the handling device 1 can be movable from a transfer position 118 along the platform 8 to be opposite each of the units 4-7.

Figure 3:
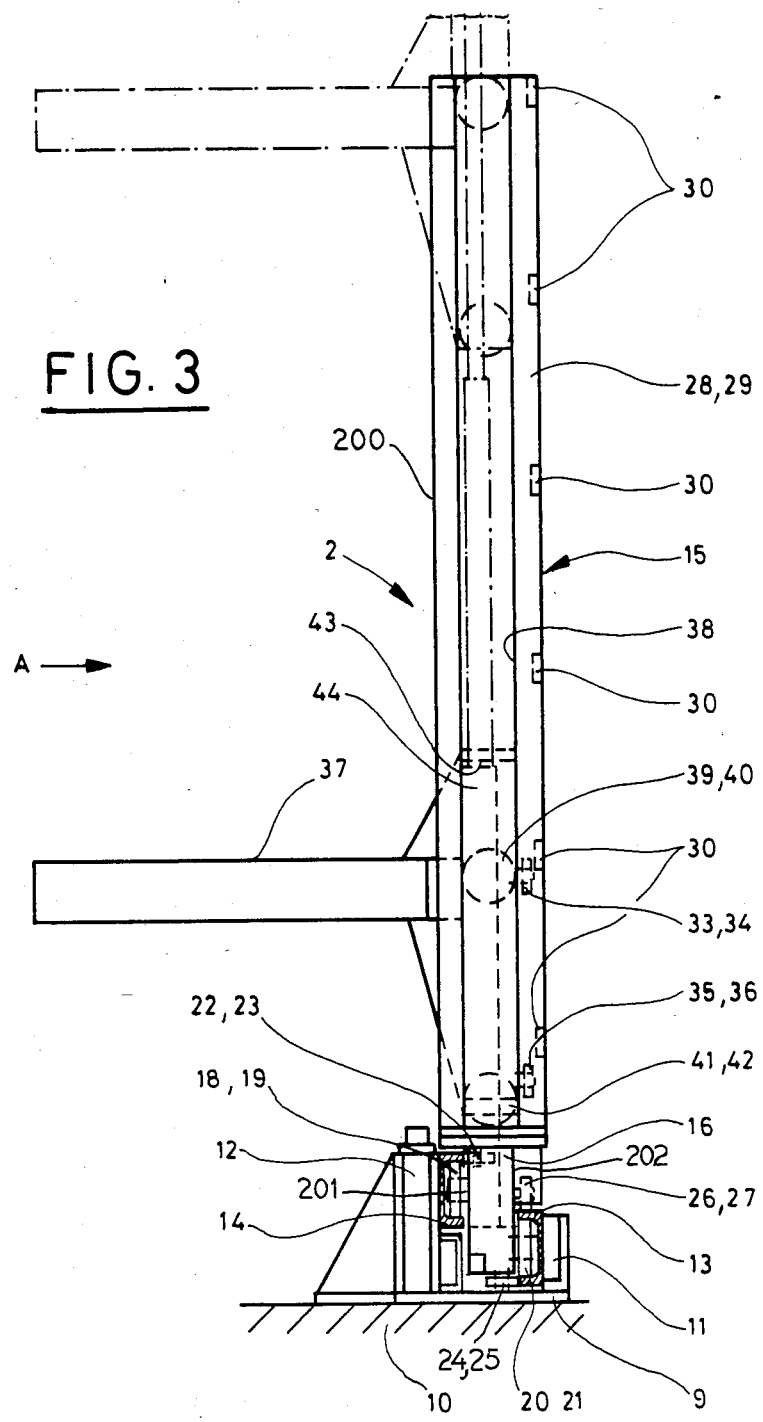
FIG. 3 is an end view of a carrier member of the handling device of the present invention.
Figure 4:
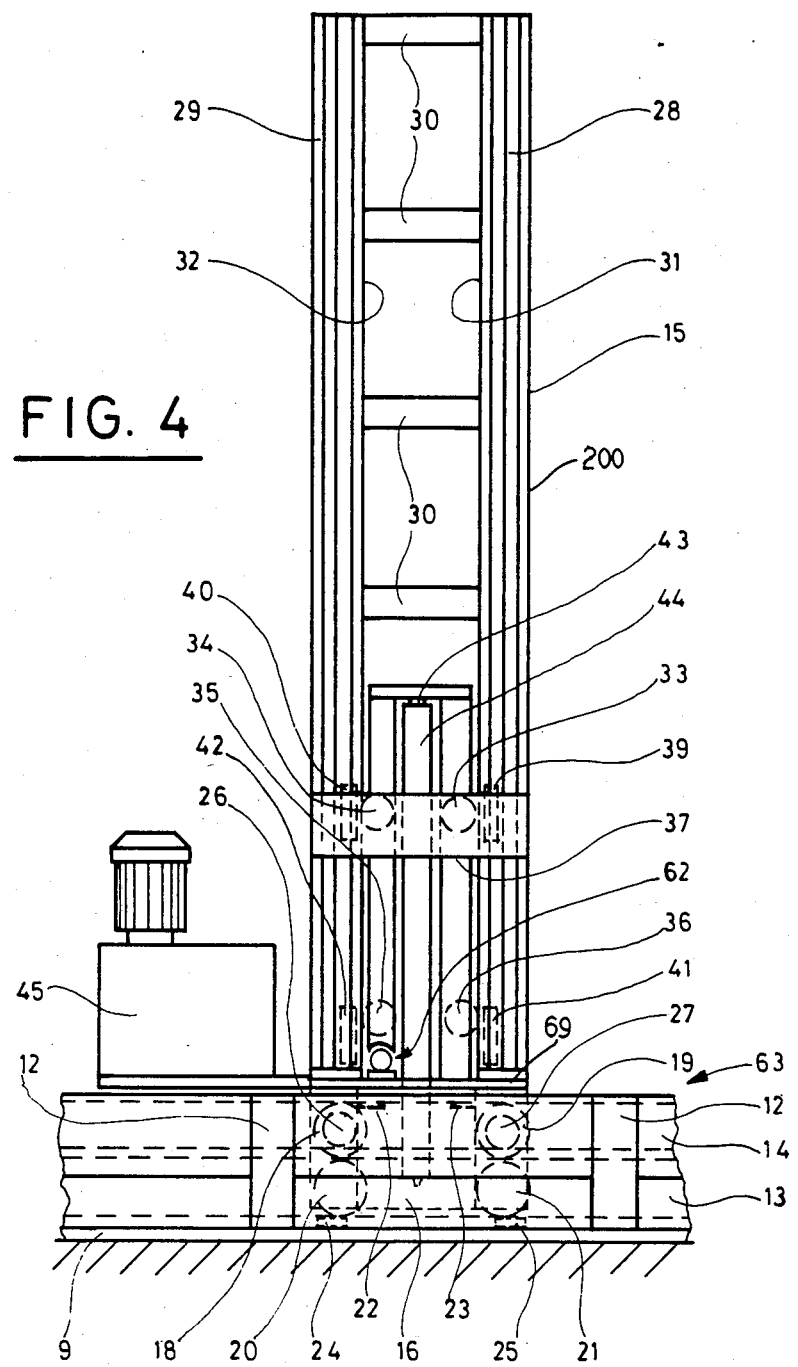
FIG. 4 is a side view of the carrier member as taken in a direction of arrow A of FIG. 3.

As illustrated in FIGS. 1 and 2, the handling unit 2 includes a carrier member 15 which is movable from the transfer position 118 of FIG. 1 on a roller path or horizontal track 63 along the platform 8. The roller path 63, as best illustrated in FIGS. 3 and 4, is formed by a base plate 9, which is mounted on a floor 10 of the press room. The base plate 9 supports two vertical support groups or elements 11 and 12, which in turn position channel members 13 and 14 which form horizontal guiding rails which define the roller path 63. The carrier member 15 can be shifted along the roller path 63, for instance with an endless chain or by a telescopic hydraulic piston (not illustrated).

The carrier member 15 has an upper column portion 200, which is secured to a base portion, member or bolt 16, which base portion 16 has two vertically extending cheeks or surface 201 and 202. On a surface 201, two rollers 18 and 19 are spaced apart and are arranged to be received in the channel member 14 to engage one of the guiding surfaces thereof. In a similar manner, the cheek 202 has two rollers 20 and 21, which are spaced apart and are received in the channel member 13 and arranged to engage one of the guiding surfaces thereof. The column 200 supports a lifting fork 37, which will be discussed hereinafter. In order to support the weight of the column 200 and lifting fork plus things being carried by the lifting fork, two lower rollers 22 and 23 are mounted on the upper surface of the base member 16 and engage one of the flanges of the channel member 14. In a similar manner, two lower rollers 24 and 25 are mounted on a lower face of the base member 16 and engage an edge of a lower flange of the member 13. To stabilize the column 200, an additional two supporting rollers 26 and 27 are mounted on the lateral face or surface 202 and are positioned with their axes extending parallel to the axis of the rollers 18 and 19 so that the rollers 26 and 27 will engage an upper flange of the channel member 13.

Figure 5:
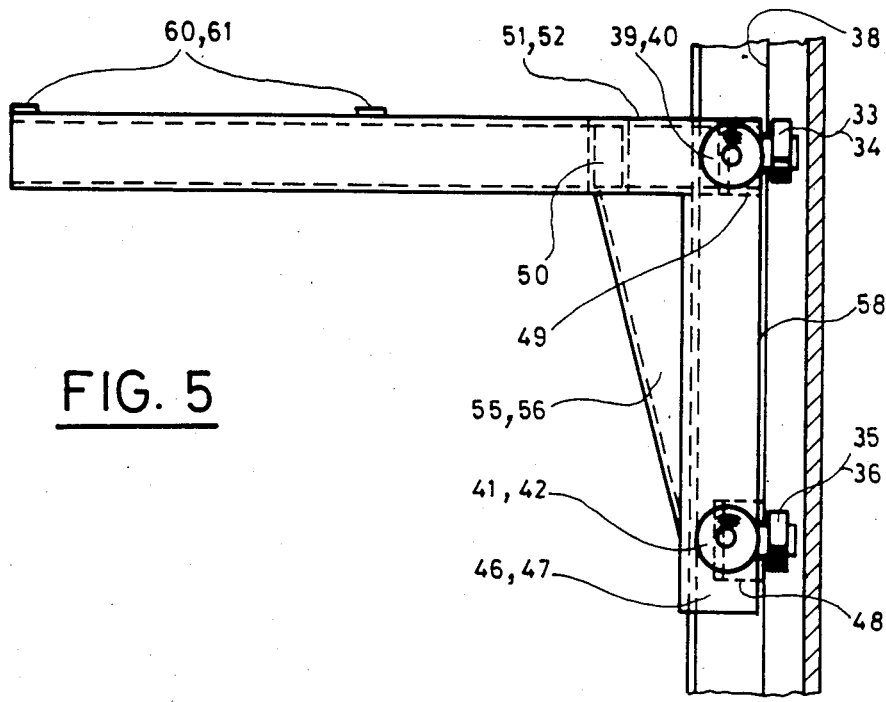
FIG. 5 is a partial cross sectional view of the carrier member illustrating an embodiment of the lifting fork of the handling device of the present invention.
Figure 6:
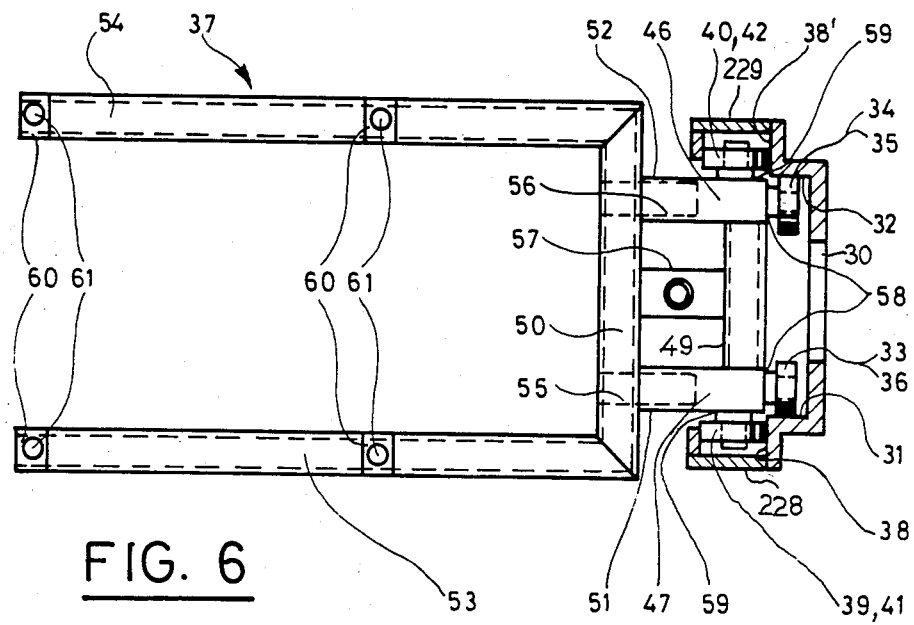
FIG. 6 is a partial cross sectional view providing a plan view of the embodiment of the lifting fork of FIG. 5.

The column 200 is made of two side portions 28 and 29 (FIG. 4), which are secured on a plate 69, which in turn is secured to the base member 16. The side portions 28 and 29, as illustrated in FIG. 6, have a folded Z-shaped configuration, and are spaced apart by cross beams 30. In addition, the member 28 has an L-shaped configuration 228 attached to an edge thereof, while the member 29 has an L-shaped configuration 229. As a result of this structure, the member 28 forms a roller path 31, as well as a roller path 38, and the member 29 has a roller path 32 and a roller path 38'. The lifting fork 37, as best illustrated in FIGS. 4, 5 and 6, has a base frame which mounts vertically positioned guide rollers 33 and 36 for engaging the roller path 31 of the member 28 and vertically disposed guide rollers 34 and 35 for engaging the guide roller path 32 of the member 29. In a similar fashion, the frame also supports vertically disposed guide rollers 39 and 41 for engaging the roller path 38 of the side member 28 and rollers 40 and 42 for engaging the roller path 38' of the side member 29. The frame, as illustrated in FIGS. 3 and 4, can have a portion that extends above the fork 37 or, as illustrated in the embodiments of FIGS. 5 and 6, the fork is at the upper end of the frame. In either embodiment, as best illustrated in FIG. 4, the lifting fork and its associated base frame are raised and lowered by means for moving the fork which is illustrated as being a hydraulic cylinder 44, which is mounted on the base member 16, and has a telescopic piston rod 43 connected to a portion of the frame for raising and lowering the frame and fork 37 in the vertical column 200. To provide the hydraulic fluid, a hydraulic pump group 45 (see FIG. 4), which includes a pump, motor and reservoir, is provided.

A detailed illustration of the construction of the fork 37 and the base frame for the fork is illustrated in FIGS. 5 and 6. The fork and its frame are constructed out of steel tubes and have sort of an L-shape profile (as illustrated in FIG. 5). The base frame has two tubes 46 and 47, which are connected to each other by cross bars 48 and 49, and which as illustrated are welded together to form a rigid frame. On an upper end of the frame, two connecting pieces 51 and 52 extend outward and are connected to a cross member 50 of the fork. A horizontal portion of the fork is formed by two horizontal beams 53 and 54, which are connected to the ends of the cross member 50, as best illustrated in FIG. 6. The construction of the horizontal portion and frame is strengthened by welded pieces 56 between the tube 46 and its connecting piece 52, as well as a portion of the cross member 50. In a similar manner, a cross piece 55 extends from the frame member 47 and is connected to the connecting member 51 and also a portion of the transverse member 50. Intermediate the two connecting members 51 and 52 in an embodiment of FIGS. 5 and 6 is a connecting member 57, which receives an end of the piston rod. As illustrated, the frame members 46 and 47 have back surfaces 58 and outer side surfaces 59. As illustrated, the rollers 34 and 35 are secured to the back surface 58 of the member 46 while the rollers 33 and 36 are secured to the back surface 58 of the member 47. In a similar manner, the outer surface 59 of the member 46 supports the rollers 40 and 42, while the outer surface 49 of the member 47 supports the rollers 39 and 41. To complete the fork structure, each of the beams 53 and 54 have spaced supporting plates 60 which are provided with centering holes 61, which holes extend through both the plate and the upper portion of the respective beams 53 and 54. The purpose and the function of these centering holes 61 will be explained hereinafter.

Figure 7:
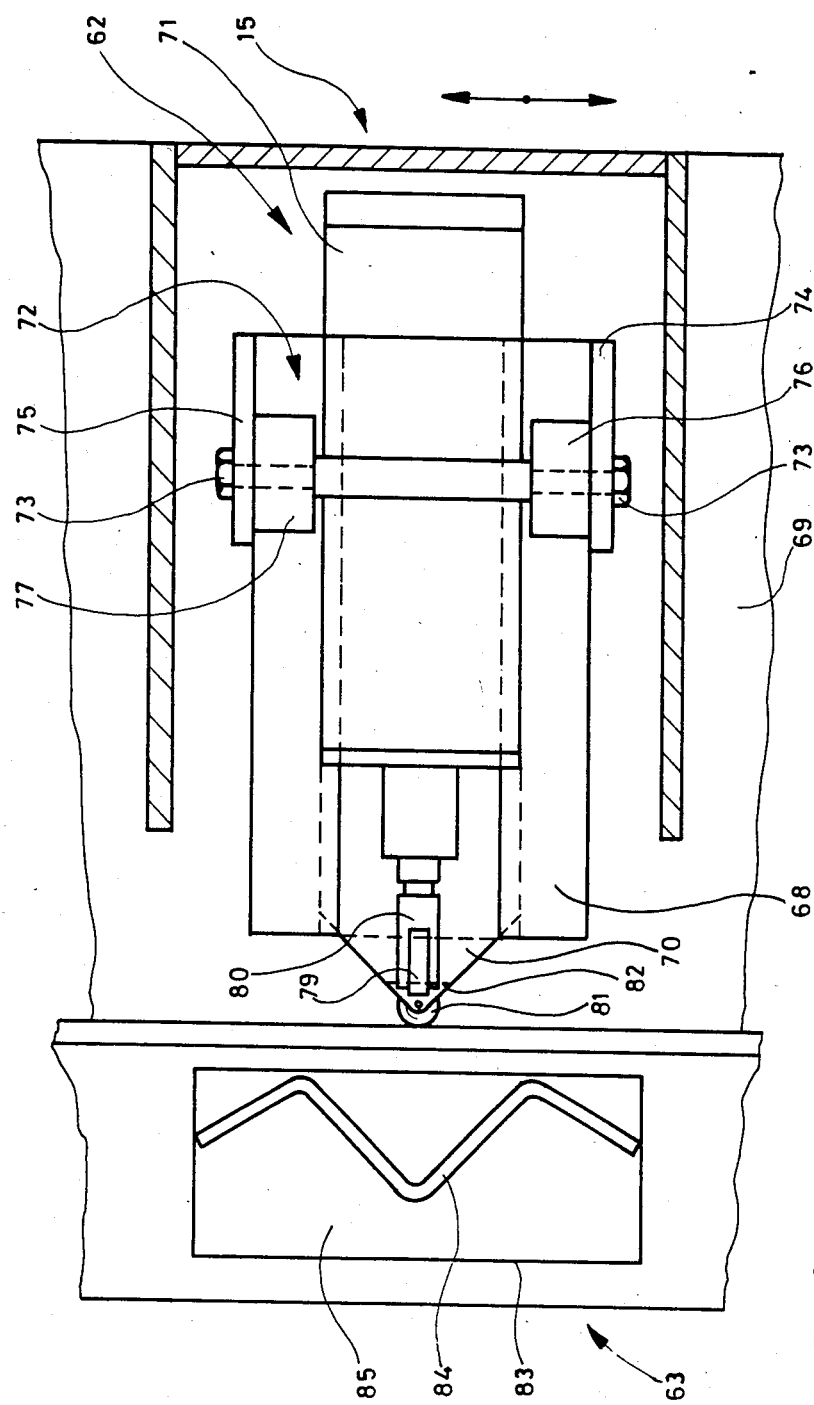
FIG. 7 is a partial cross sectional view illustrating coacting elements forming a centering device or arrangement for the handling device of the present invention.
Figure 8:
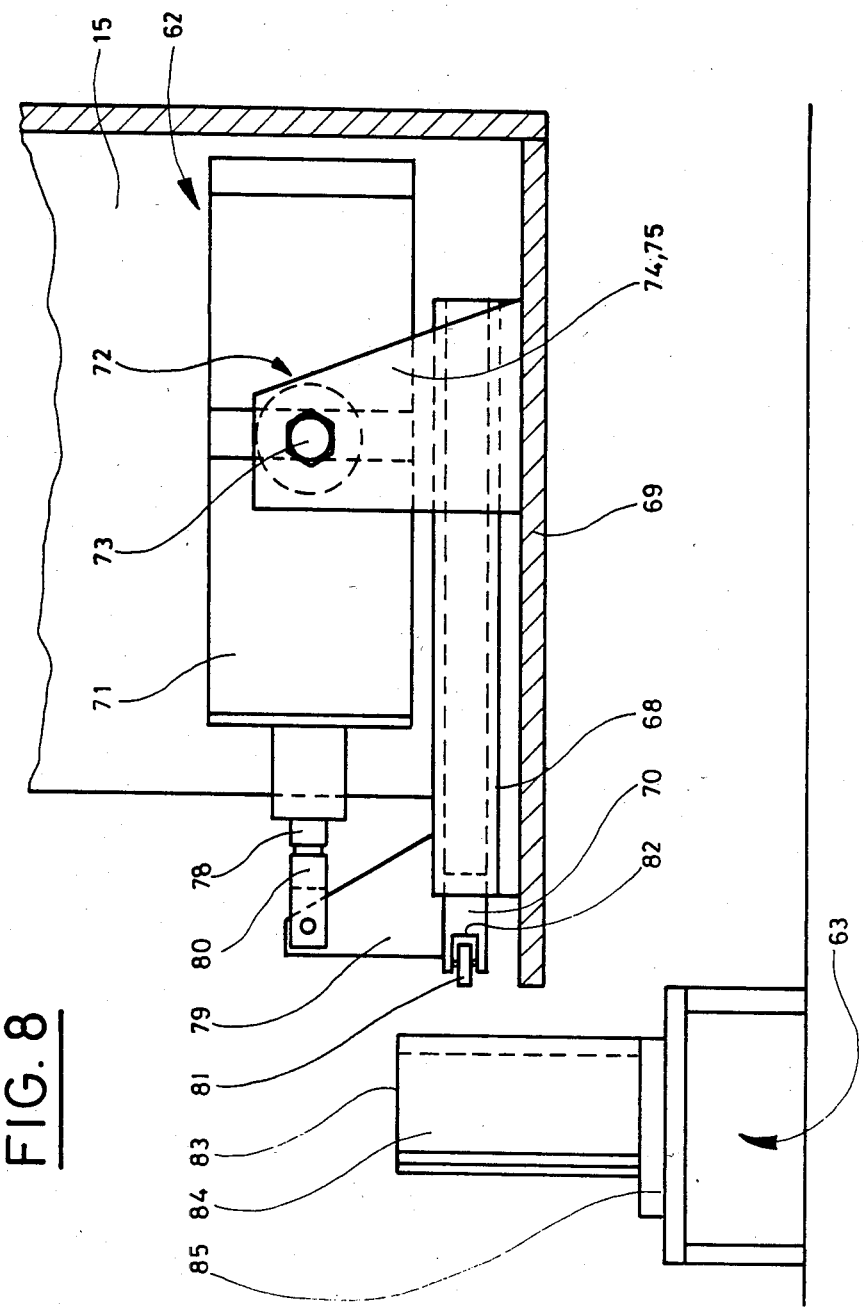
FIG. 8 is a side view of the centering device of FIG. 7.

As mentioned previously in regard to FIG. 1, the carrier member 15 is movable along the track 63 between a transfer station or position 118 and each of the units such as 4, 5 and 6. To locate the carrier member 15 in the right position for each of these positions, the track or rolling surface 63 is provided with location points 64, 65, 66 and 67. Each of these location points is formed by a part which coacts with a positioning ram, generally indicated at 62 in FIGS. 7 and 8, and is mounted on the carrier member 15, such as in the position illustrated in FIG. 4. The positioning means or ram 62 includes a sliding guide 68 which is mounted on a plate such as 69 of the carrier member 15. The guide 68 carries a sliding block or plate 70 which has a groove 82 in which a wheel or roller 81 is mounted for rotation. To move the sliding plate 70, the plate is provided with an upstanding wing or brace 79, which is attached by a fork connection 80 on a piston rod 78 of a hydraulic cylinder 71. The hydraulic cylinder 71 is mounted for pivotal movement on the base 62 by a trunnion 72, which includes a bolt 73 extending between two upstanding members or cheeks 74 and 75, which cheeks are provided with bosses 76 and 77, respectively.

To coact with the roller 81, each of the stations or positions on the track 63 include a stop element 83, which is formed by a piece of metal 84 bent to form a V-shaped recess or notch facing the roller 81 and mounted on a plate 85. These units 83 are secured to each of the points such as 64–67 of the roller path 63. As the roller 81 moves into the V-shaped notch, it will cause the carrier member 15 to be shifted laterally on the track until the roller 81 is in the base or the apex of the V-shaped notch.

Figure 10:
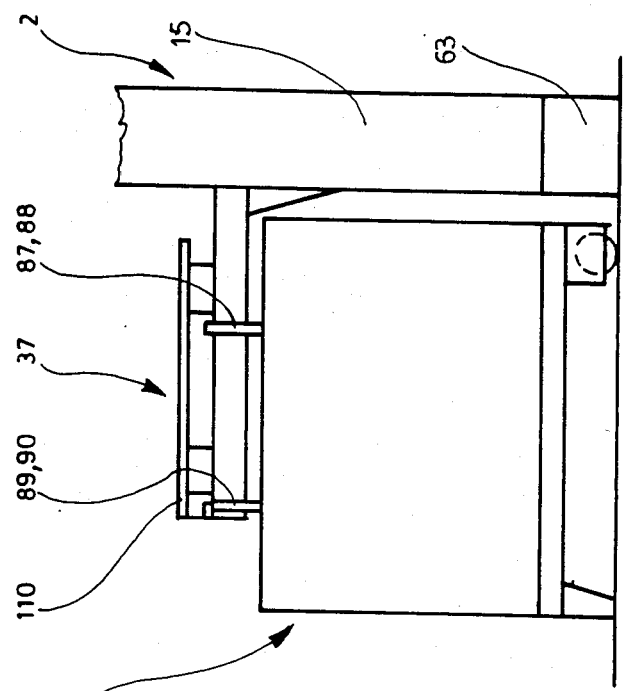
FIG. 10 is an end view of the carrier member gripping the tool holder carriage as taken from a direction of arrow B of FIG. 9.
Figure 9:
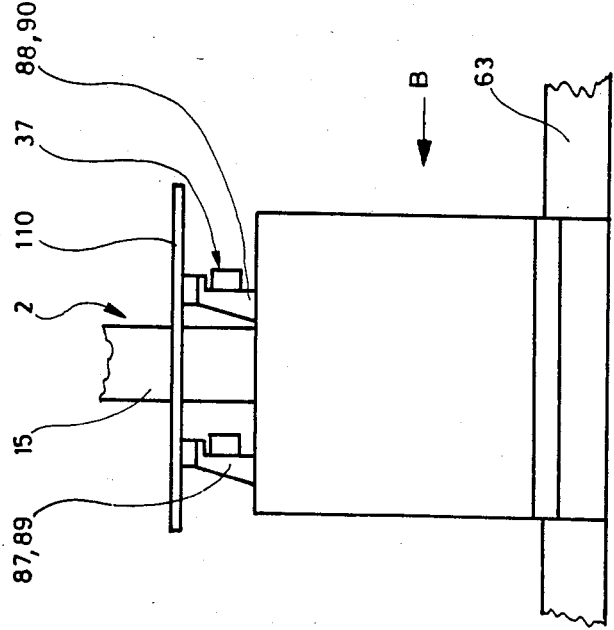
FIG. 9 is a side view of the handling device of the present invention gripping a tool holder carriage in accordance with the present invention.

The handling device of the present invention utilizes a lifting fork to transport a tool holder carriage 86. The carriage 86 has four hands or hooks 87, 88, 89 and 90, which engage the lifting fork, as illustrated in FIGS. 9 and 10.

Figure 11:
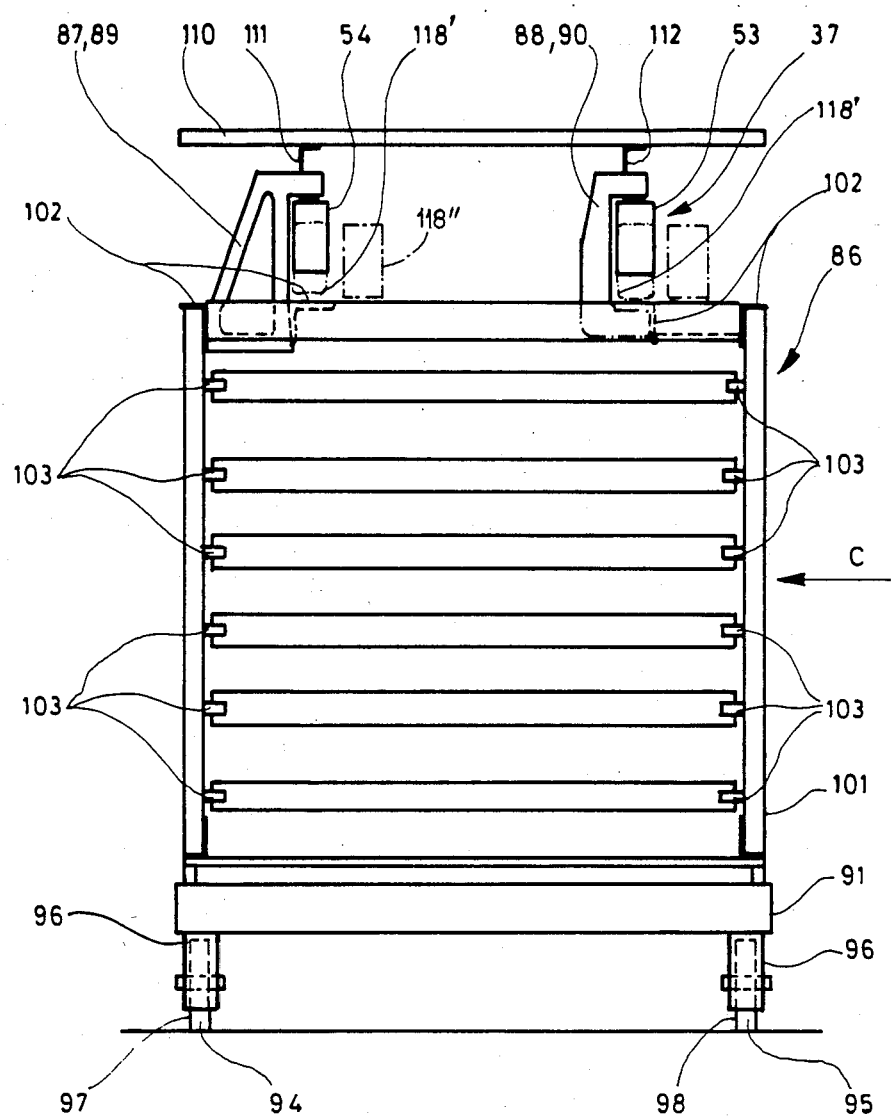
FIG. 11 is an end view of a tool carrier in accordance with the present invention.
Figure 12:
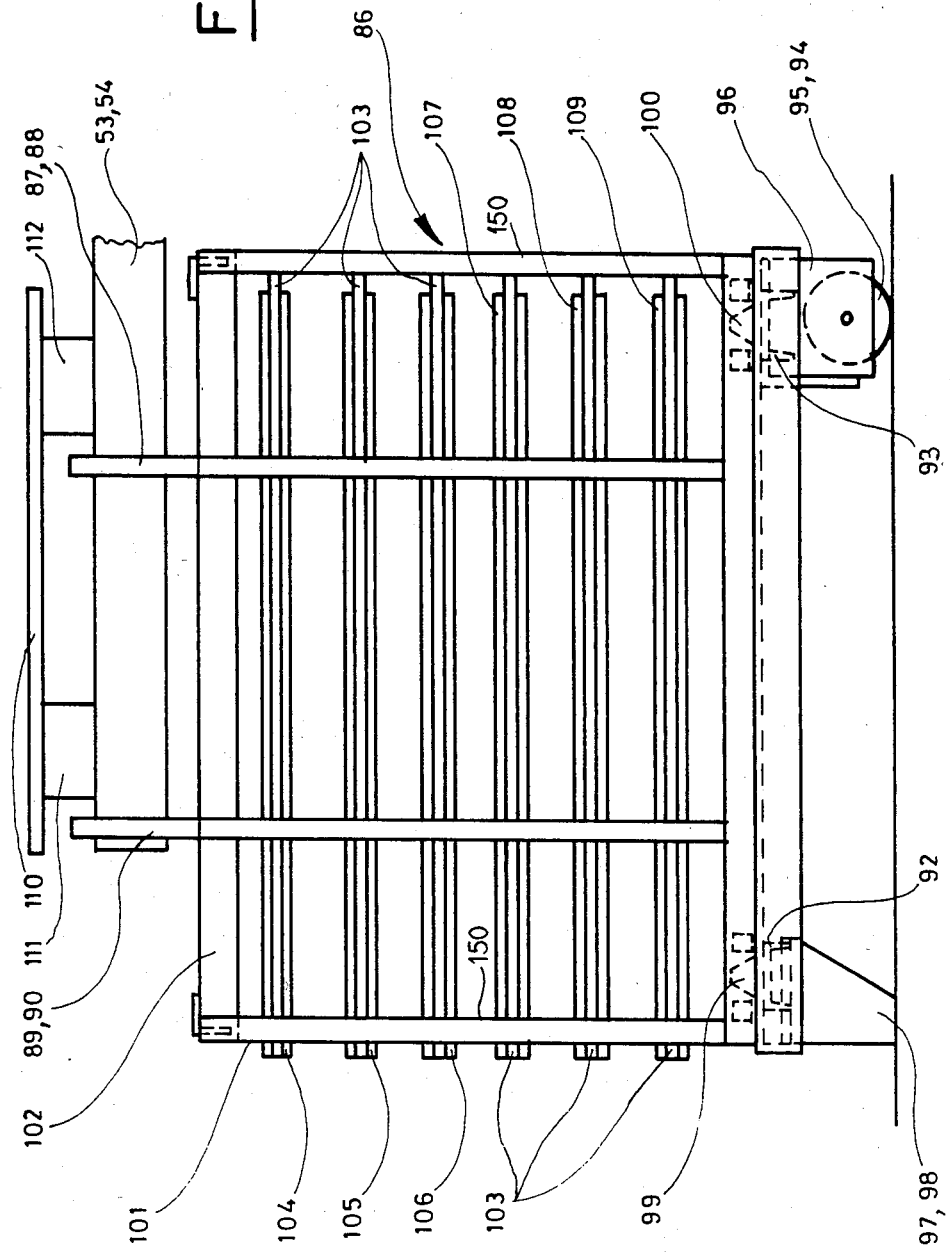
FIG. 12 is a side view of the tool carrier of FIG. 11 taken from a direction of the arrow C of FIG. 11.

As best illustrated in FIGS. 11 and 12, the tool holder carriage 86 has a lower frame 91 which is formed of angle irons and the base of this frame 91 is braced at each end by a U-shaped, or channel-shaped cross piece 92 and 93. At the end having the channel-shaped cross piece 93, wheels 94 and 95 are mounted in support brackets 96. At the end having the cross piece 92, two support feet 97 and 98 are provided (see FIG. 12). The cross pieces 92 and 93 also each support two centering pins 99 and 100, respectively. Each of the pins has a cylindrical base with a conical head portion. These centering pins are utilized for positioning a storage frame 101 on the frame 91, and this storage frame is then coupled thereto by means not illustrated.

Figure 13:
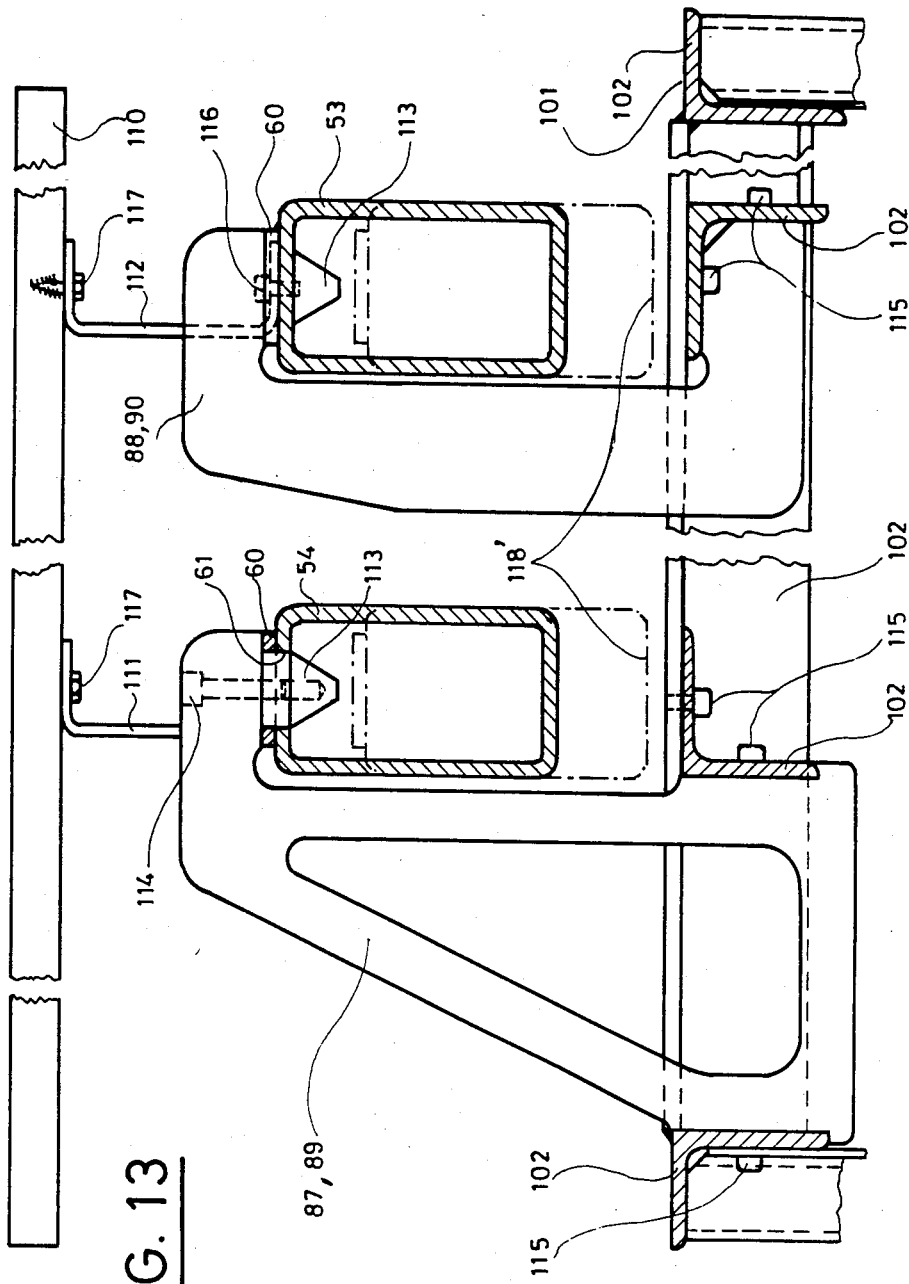
FIG. 13 is an enlarged partial cross sectional view illustrating the mounting of the tool holder carriage on the lifting forks of the handling device of the present invention.

The storage frame 101 is made up of welded tubes, such as upper cross members 102 and vertical members 150. The vertical members 150 position slides 103 which receive frames for the various tools to be installed or removed from the platen press 1. For example, the tool holder carriage 86 includes a storage frame 101 equipped with a cutting plate 104, a set of upper tools 105 and 106 for delivery of cut blanks, a set of lower tools 107 and 108, and a set of cutting tools 109. The upper cross pieces 102, as best illustrated in FIG. 13, support the hook or hand members 87–90. In FIGS. 11 and 12, the tool holder carriage 86 is shown in its tool loading or tool removing position, for example, when the tools are loaded in the press and when they are completely removed from the press to be changed. The beams 53 and 54 of the lifting fork are then engaged in the hook members 87–90 and in FIGS. 11 and 12, a preparing table 110 is secured with screws onto angle iron supports 111 and 112, which are arranged on an upper surface of the beams 53 and 54 of the lifting fork.

As best illustrated in FIG. 13, the upper parts of each of the hand or hook members 87–90 are provided with centering pins such as 113, which are constructed like the centering pins 99 and 100 of the frame 91. These pins 113 will be engaged in centering hole 61 arranged on the supporting plate 60 of the beams 53 and 54 of the lifting fork 37. The centering pins 113 are secured on each of the hook members 87–90 with screws such as 114. As shown, the hook members 87–90 are secured against the upper cross pieces 102 with screws or fasteners 115. The angle irons 111 and 112, which support the table 110, are secured to the two beams 53 and 54 by screws or fasteners 116 and the table 110 is secured onto these angle irons by fasteners or screws 117. As illustrated in FIG. 13, a disconnecting of the beams 53 and 54 of the lifting fork 37 is accomplished by lowering the fork 37 relative to the carriage 86 to the position illustrated by 118' in chain lines. When this occurs, the beams 53 and 54 are disconnected from the centering pins such as 113 and, thus, a lateral shifting of the carriage to the beams is possible.

The device of the present invention operates in the following manner: While a job is being done in the press 1, the operator prepares the tools for the next job, and these tools are then loaded into a tool holding carriage such as 86, shown in FIGS. 11 and 12, and positioned near the handling device 2. Just before the end of the job in the press, the operator then positions the carriage 86, which was empty, in front of the first unit, such as the cutting unit 4, where the tools are to be removed. As soon as this job is finished, the operator can load the tools of that unit, such as the cutting tools, into the storage frame 101. This is accomplished by positioning the slide such as 103 in front of the tools by utilizing the lifting fork 37 and then removing the tool holder from that unit. Then, the carriage is shifted by the carrier member 15 along the roller path 63 to the next unit and is positioned by the centering means or the means for centering such as by having the roller 81 engaged in a notch or stop for the position 66. Then, the lifting fork 37 is adjusted to present the desired slide opening for receiving the tools from this next unit, such as the upper stripping tools in one slide group and then moving to receive the lower group of stripping tools. After receiving the tools from this unit, then the carrier member 15 is shifted to the next unit in which tools are to be removed. After completion of a removal of all the tools, the carrier unit 15 is positioned in the transfer position 118, as illustrated in FIGS. 1 and 2. Then the fork is lowered so that the carriage 86 rests on its wheels on the floor 10. The fork is then shifted further downward to move the fork to the position 118' (FIGS. 11 and 13), which causes a release or uncoupling of the carriage from the beams 53 and 54 of the fork. Then the carriage can either be withdrawn or the centering device or means can be removed to allow a slight offset of the beams 53 and 54, such as illustrated by the position 118" in FIG. 11, which enables raising the fork 37 to enable removal of the carriage.

After the carriage having the tools that were removed has been moved out of position, the carriage with the new tools is positioned so that the beams 53 and 54 can be moved to the position 118' and then raised so that the centering pins 113 are engaged in the openings 61. Now the operator can lift the new carriage having the new set of tools with the fork and by shifting the carrier member 15 along the roller track or path 63 to the various units, can position each of the slides of the carriage to introduce new cutting tools, new stripping tools, and new blank removable tools in the appropriate units 4, 5, 6 and 7.

Once the tools are loaded, the operator can choose either to work with the table 110 or to remove the carriage from the working area of the machine. If he chooses to use the table 110, he can have it lifted to the desired height and move it along the whole length of the machine in front of each of the units where the operation is requested. In order to give the operator the choice between several solutions, the tool holder carriage can be shifted with or without its lower frame 91, which has the wheels and supports. In other words, the wheels for transporting the storage frame 101 can be left on the floor 10 at station 118 as the store is moved to the various units.

The user of the device can also use the device to facilitate the job in reduced time needed for replacing the whole equipment of a platen press. The device also reduces the risk connected with the handling and transport of heavy and big tools and, thus, requires only one operator for all of the operations. Other advantages are the fact that the assembly does not take any room in the work area of the machine when it is not in use.

Although various minor modifications may be suggested by those versed in the art, it should be understood that I wish to employ within the scope of the patent granted hereon, all such modifications as reasonably and properly come within the scope of my contribution to the art.

I claim:

1. A handling device for exchanging tools of a cutting press having at least two units arranged in a row for acting on a blank sequentially as it moves along a side of the press, said device including a roller path extending along the press, a carrier member having a column being movable on said roller path, said column having a lifting fork movable vertically therein and means for moving the fork in said column, said fork having means for releasably coupling a tool holder carriage to said fork for movement therewith, said fork being provided with a table above the means for releasably coupling and said carrier member and said roller path having coacting means for centering the carrier member at each of the units and at a transfer station.

2. A device according to claim 1, wherein the roller path is constructed of a base plate supporting two guide rollers providing a roller path, said roller path having centering stops forming part of the coacting means positioned at each of the units and at the transfer station, and said carrier member being provided adjacent a lower part with a centering element engagable in each of said centering stops.

3. A device according to claim 1, wherein the column of the carrier member is formed by two leg portions connected by crossbars and the two leg portions provide guiding roller paths for the lifting fork.

4. A device according to claim 3, wherein the lifting fork has a bracket shape with a base frame with a horizontal portion extending therefrom, said base frame supporting rollers engaging the guiding roller paths in the leg portions, and said horizontal portion of said lifting fork having two horizontal arms being composed of two beams, each having support plates with centering holes.

5. A device according to claim 4, wherein the centering holes on said arms receive centering pins mounted on hook members secured to a cross member of the tool holder carriage.

6. A device according to claim 1, wherein the lifting fork has two beam members having support members on an upper surface, said table being detachably secured to said support members.

7. A device according to claim 1, wherein the coacting means for centering include a sliding blade member having one end provided with a notch receiving a roller, said roller being engagable in a centering stop to accomplish the centering operation.

8. A device according to claim 7, wherein each centering stop comprises a piece of sheet metal being bent to form a V-shaped groove, said stops being positioned on the roller path at each of the units and the sliding plate with the roller being mounted on the carrier member.

9. A device according to claim 1, wherein the tool carriage is composed of a base frame and a storage frame, said storage frame being detachably connected to the base frame and being provided with slides for receiving the sets of tools, said base frame having centering pins for centering the storage frame on said base frame as the storage frame is secured on said base frame.

* * * * *